(12) United States Patent
Shaw

(10) Patent No.: US 11,838,687 B2
(45) Date of Patent: Dec. 5, 2023

(54) METHOD, COMPUTER PROGRAM AND SYSTEM FOR CONFIGURING A MULTI-POINT VIDEO CONFERENCING SESSION

(71) Applicant: Pexip AS, Oslo (NO)

(72) Inventor: Eamonn Shaw, Fredrikstad (NO)

(73) Assignee: Pexip AS

( * ) Notice: Subject to any disclaimer, the term of this patent is extended or adjusted under 35 U.S.C. 154(b) by 0 days.

(21) Appl. No.: 17/675,077

(22) Filed: Feb. 18, 2022

(65) Prior Publication Data
US 2022/0272301 A1 Aug. 25, 2022

(30) Foreign Application Priority Data
Feb. 22, 2021 (NO) .................................. 20210230

(51) Int. Cl.
*H04N 7/14* (2006.01)
*H04N 7/15* (2006.01)

(52) U.S. Cl.
CPC ............. *H04N 7/152* (2013.01); *H04N 7/147* (2013.01); *H04N 7/157* (2013.01)

(58) Field of Classification Search
CPC ..... H04L 12/16; H04L 12/18; H04L 12/1813; H04L 12/1822; H04L 12/1827; H04L 51/07–18; H04N 7/14; H04N 7/141; H04N 7/147–148; H04N 7/15; H04N 7/152; H04N 7/157
See application file for complete search history.

(56) References Cited

U.S. PATENT DOCUMENTS

| | | | |
|---|---|---|---|
| 11,089,163 B2 * | 8/2021 | Abraham | H04M 3/562 |
| 11,522,952 B2 * | 12/2022 | Abu-Ghazaleh | H04L 67/02 |
| 2008/0267095 A1 | 10/2008 | Sekaran et al. | |
| 2009/0009587 A1 | 1/2009 | Lindbergh | |
| 2009/0254843 A1 | 10/2009 | Van Wie et al. | |

(Continued)

OTHER PUBLICATIONS

Cox, "Multipoint Videoconferencing—What is It?", streetdirectory.com (Year: 2010).*

(Continued)

*Primary Examiner* — Boris D Grijalva Lobos
(74) *Attorney, Agent, or Firm* — Christopher & Weisberg, P.A.

(57) ABSTRACT

A multi-point videoconferencing system includes video conferencing terminals in communication with a multipoint conferencing node (MCN). A method includes defining at least a first virtual studio and a second virtual studio, each of the at least first and second virtual studios having a policy for each of a set of the tags; initiating a first multi-point videoconferencing session according to the first virtual studio, such that each of the video conferencing terminals in the first multi-point videoconferencing session is connected to the MCN according to the first virtual studio policy of at least one tag of the video conferencing terminal; and reconfiguring, upon switching to the second virtual studio, the first multi-point videoconferencing session according to the second virtual studio, such that each of the videoconferencing terminals in the first multi-point videoconferencing session is connected to the MCN according to the second virtual studio policy for at least one tag.

15 Claims, 4 Drawing Sheets

(56) References Cited

U.S. PATENT DOCUMENTS

| | | |
|---|---|---|
| 2014/0122657 A1 | 5/2014 | Crawley et al. |
| 2018/0012191 A1* | 1/2018 | Rosenberg .............. H04L 67/01 |
| 2018/0262542 A1 | 9/2018 | Lau et al. |
| 2020/0097309 A1* | 3/2020 | Chopra ............... G06F 11/1448 |
| 2022/0224554 A1* | 7/2022 | Hassan ............... H04L 12/1827 |

OTHER PUBLICATIONS

Norwegian Search Report for corresponding Norwegian Application No. 20210230, dated Jun. 22, 2021, consisting of 2 pages.

European Patent Office, International—Type Search Report for corresponding Norwegian Application No. 20210230, dated Oct. 7, 2021, consisting of 7 pages.

\* cited by examiner

501

502A

502B

METHOD, COMPUTER PROGRAM AND SYSTEM FOR CONFIGURING A MULTI-POINT VIDEO CONFERENCING SESSION

CROSS-REFERENCE TO RELATED APPLICATION

This application is related to and claimed priority to Norwegian Patent Application No. 20210230, filed Feb. 22, 2021, entitled METHOD, COMPUTER PROGRAM AND SYSTEM FOR CONFIGURING A MULTI-POINT VIDEO CONFERENCING SESSION, the entirety of which is incorporated herein by reference.

FIELD

The present invention relates to configuring a multipoint videoconferencing session, in particular initiating and reconfiguring the multipoint videoconferencing session on tag-based policies.

BACKGROUND

Transmission of moving pictures in real-time is employed in several applications like e.g. video conferencing, team collaboration software, net meetings and video telephony. Terminals and endpoints being able to participate in a conference may be traditional stationary video conferencing endpoints, external devices, such as mobile and computer devices, smartphones, tablets, personal devices and PCs, and browser-based video conferencing terminals.

Video conferencing systems allow for simultaneous exchange of audio, video, and data information among multiple conferencing sites. For performing multipoint video conferencing, there usually is a Multipoint Conferencing Node (MCN) that provides switching and layout functions to allow the endpoints and terminals of multiple sites to intercommunicate in a conference. Such nodes may also be referred to as Multipoint Control Units (MCUs), Multi Control Infrastructure (MCI), Conference Nodes and Collaborations Nodes (CNs). MCU is the most common used term, and has traditionally has been associated with hardware dedicated to the purpose, however, the functions of an MCN could just as well be implemented in software installed on general purpose severs and computers, so in the following, all kinds of nodes, devices and software implementing features, services and functions providing switching and layout functions to allow the endpoints and terminals of multiple sites to intercommunicate in a conference, including (but not excluding) MCUs, MCIs and CNs are from now on referred to as MCNs.

An MCN links the sites together by receiving frames of conference signals from the sites, processing the received signals, and retransmitting the processed signals to appropriate sites. The conference signals include audio, video, data and control information. As an example, in a switched conference, the video signal from one of the conference sites, typically that of the loudest speaker, is broadcasted to each of the participants. In a so-called continuous presence conference, video signals from two or more sites are spatially mixed to form a composite video signal for viewing by conference participants. When the different video streams have been mixed together into one single video stream, the composed video stream is transmitted to the different parties of the video conference, where each transmitted video stream preferably follows a set scheme indicating who will receive what video stream. The continuous presence or composite video stream is a combined picture that may include live video streams, still images, menus, indicators or other visual images from participants in the conference.

The MCN creates dynamic layouts of the mixed video picture in video conferencing in order to achieve natural and intuitive engagement of the participants in line with physical presence meeting room settings. When emulating larger events, such as all hands meetings, townhall meetings, virtual conferences combining lectures and breakout sessions, in a videoconference session, the traditional meeting room settings often fall short. For example, in a company all hands meeting, handover from a first site (e.g. Oslo) to a second site (e.g. Tokyo) is often difficult, and requires the first site to mute it's sound, and the second site to remember to unmute before starting to talk. The first site may need to pass presentation rights to the second site before the second site can present. Additionally, a third site may, if not muted, be considered the loudest speaker and be broadcasted to all participants instead of the second site.

Therefore, there is a need for a system and method of creating an intuitive and physical presence like multipoint videoconference experience handling transitions between different presentation and participant scenarios.

SUMMARY

In view of the above, an object of the present invention is to overcome or at least mitigate drawbacks of prior art video conferencing systems.

In a first aspect the invention provides a method of a multi-point videoconferencing system comprising a plurality of video conferencing terminals in communication with a multipoint conferencing node, wherein each of the videoconferencing terminals is assigned at least one of a plurality of tags, the method comprising the steps of:
 defining at least a first virtual studio and a second virtual studio, each of the at least first and second virtual studios comprising a policy for each of a set of the plurality of tags,
 initiating a first multi-point videoconferencing session according to the first virtual studio, such that each of the video conferencing terminals in the first multi-point videoconferencing session is connected to the MCN according to the first virtual studio policy of at least one tag of the video conferencing terminal; and
 reconfiguring, upon switching to the second virtual studio, the first multi-point videoconferencing session according to the second virtual studio, such that each of the videoconferencing terminals in the first multi-point videoconferencing session is connected to the MCN according to the second virtual studio policy for at least one tag of the video conferencing terminal.

The method may further comprise the steps of defining a switching sequence of the at least first and second virtual studios, and switching between the at least first and second virtual studios according to the defined switching sequence.

The step of switching to the second virtual studio may further comprise initiating a second multi-point videoconferencing session, such that each of the videoconferencing terminals in the second multi-point videoconferencing session is connected to the MCN according to the second virtual studio policy for at least one tag of the video conferencing terminal.

The step of switching to the second virtual studio may further comprise initiating a second multi-point videoconferencing session, such that each of the videoconferencing terminals in the second multi-point videoconferencing session is connected to the MCN according to a third virtual studio policy for at least one tag of the video conferencing terminal.

The defined sequence may further comprise switching from the second virtual studio or the third virtual studio to the first virtual studio, and the method further comprises terminating the second multi-point videoconferencing session when switching from the second virtual studio or the third virtual studio to the first virtual studio.

The method may further comprise assigning at least one additional tag to at least one of the videoconferencing terminals during in the first virtual studio, such that upon switching from the first virtual studio to the second virtual studio, the at least one of the videoconferencing terminals is connected to the MCN according to the second virtual studio policy or the third virtual studio policy for the at least one additional tag.

In one embodiment, the policy may comprise at least one audio setting for the videoconferencing terminals.

In one embodiment, the policy may comprise at least one video setting for the videoconferencing terminals.

In one embodiment, the policy may comprise a presentation setting.

In one embodiment, the policy may comprise at least one access setting.

In one embodiment, the at least one tag of the video conferencing terminal may be determined by a directory service listing for the video conferencing terminal.

In one embodiment, the at least one tag of the video conferencing terminal may be determined dynamically by the MCN.

In a second aspect the invention provides a multi-point videoconferencing system comprising a plurality of video conferencing terminals in communication with a multipoint conferencing node, wherein each of the videoconferencing terminals is assigned at least one of a plurality of tags, the MCN being adapted to perform the method according to the first aspect of the invention.

In a third aspect the invention provides a computer program product, comprising a non-transitory computer readable storage medium comprising instructions that, when executed on a processor in a multipoint conferencing node according to the second aspect of the invention, enables the MCN to perform the steps of the method according the first aspect of the invention.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION

According to embodiments of the present invention as disclosed herein, the above-mentioned disadvantages of solutions according to prior art are eliminated or at least mitigated.

Figure 1:
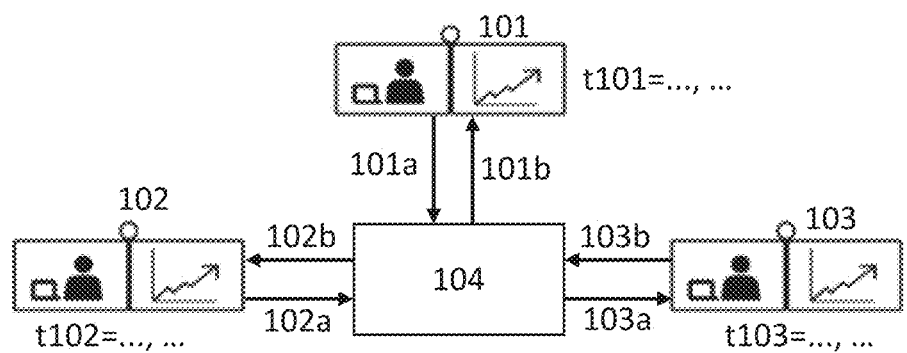
FIG. 1 is a schematic illustration of a multi-point video-conferencing system.

FIG. 1 schematically illustrates multi-point videoconferencing system 100 with three videoconferencing terminals 101, 102, 103 in communication with a multipoint conferencing node (MCN) 104. In the multi-point videoconferencing system 100 media passes through the MCN 104. Input audio and video 101*a*, 102*a*, 103*a* captured at the videoconferencing terminals 101, 102, 103 is transmitted to the MCN 104, mixed with the audio and video from the other videoconferencing terminals, and the mixed audio and video 101*b*, 102*b*, 103*b* is transmitted back to the videoconferencing terminals 101, 102, 103. Each of the videoconferencing terminals 101, 102, 103 is assigned at least one of a plurality of tags t101, t102, t103, respectively. The tags may be fixed during the conference or dynamic during the conference. Fixed tags may be assigned based on a directory service listing for the video conferencing terminal, such as physical location, organizational hierarchy level, organizational branch, employment code, etc. Dynamic tags may be assigned by the MCN based on detected events during the conference, such as raised hand, connection quality, video on/off, audio quality, face-count, weighted presence and other AC/AI related metrics. Tags may also be self-assigned before or during the conference by a user of a videoconferencing terminal.

Figure 2:
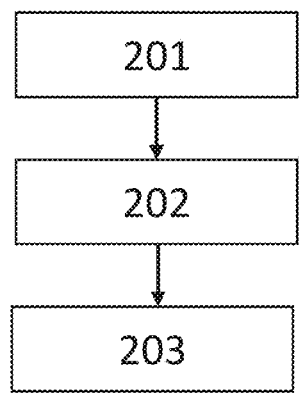
FIG. 2 is a flowchart illustrating an exemplary method according to one embodiment.

FIG. 2 is a schematic illustration of a method 200 of a multi-point videoconferencing system 100 comprising a plurality of video conferencing terminals 101, 102, 103 in communication with a multipoint conferencing node (MCN) 104, wherein each of the videoconferencing terminals 101, 102, 103 is assigned at least one of a plurality of tags. The first step 201 comprises defining at least a first virtual studio and a second virtual studio. Each of the at least first and second virtual studios comprises a policy for each of a set of the plurality of tags. The policies may be defined in a graphical user interface in the multipoint conferencing node 104. Alternatively, the policies may be provided to the multipoint conferencing node 104 using an application programming interface (API). In the next step 202, a first multi-point videoconferencing session is initiated according to the first virtual studio, such that each of the video conferencing terminals in the first multi-point videoconferencing session is connected to the MCN according to the first virtual studio policy of at least one tag of the video conferencing terminal. Then in the next step 203, the first multi-point videoconferencing session is reconfigured according to the second virtual studio, such that each of the videoconferencing terminals in the first multi-point videoconferencing session is connected to the MCN according to the second virtual studio policy for at least one tag of the video conferencing terminal.

The step of defining at least a first virtual studio and a second virtual studio may in one embodiment comprise the steps of defining a switching sequence of the at least first and second virtual studios, and switching between the at least first and second virtual studios is performed according to the defined switching sequence. The switching sequence may also include switching back to the first virtual studio, or any other virtual studio. The switching sequence may be manual or automatic.

In one embodiment, the videoconferencing terminals 101, 102, 103 may be assigned at least one additional tag during the videoconferencing session of the first virtual studio, such that upon switching from the first virtual studio to the second virtual studio, the at least one of the videoconferencing terminals is connected to the MCN according to the second virtual studio policy for the at least one additional tag. The additional tags may be dynamic tags assigned by the MCN based on detected events during the conference, such as raised hand, connection quality, video on/off, audio quality etc. The additional tag may also be self-assigned by a user of a videoconferencing terminal.

In one embodiment, the policy comprises at least one audio setting for the videoconferencing terminals 101, 102, 103. The audio setting may for example define whether audio from the videoconferencing terminal 101, 102, 103 is transmitted or not, muted, audio direction from a videoconferencing terminal to another videoconferencing terminal etc.

In one embodiment, the policy comprises at least one video setting for the videoconferencing terminals 101, 102, 103. The video setting may for example define whether the videoconferencing terminal 101, 102, 103 is transmitting video, receiving video, video direction from a videoconferencing terminal to another videoconferencing terminal, layout of composite video signal etc.

In one embodiment, the policy comprises at least one presentation setting for the videoconferencing terminals 101, 102, 103. The presentation setting may for example define whether the videoconferencing terminals 101, 102, 103 is allowed to share a presentation, presentation direction from a from a videoconferencing terminal to another videoconferencing terminal etc.

In one embodiment, the policy comprises at least one access setting for the videoconferencing terminals 101, 102, 103. The access setting may for example define which of the videoconferencing terminals 101, 102, 103 that are allowed to enter a virtual studio, inviting videoconferencing terminals 101, 102, 103 to a virtual studio etc.

Each of the virtual studios may have policies for one or more of audio settings, video settings, presentation settings, access settings and other suitable policies.

The policies of the virtual studios may override local settings of the of the videoconferencing terminals 101, 102, 103.

Figure 3:
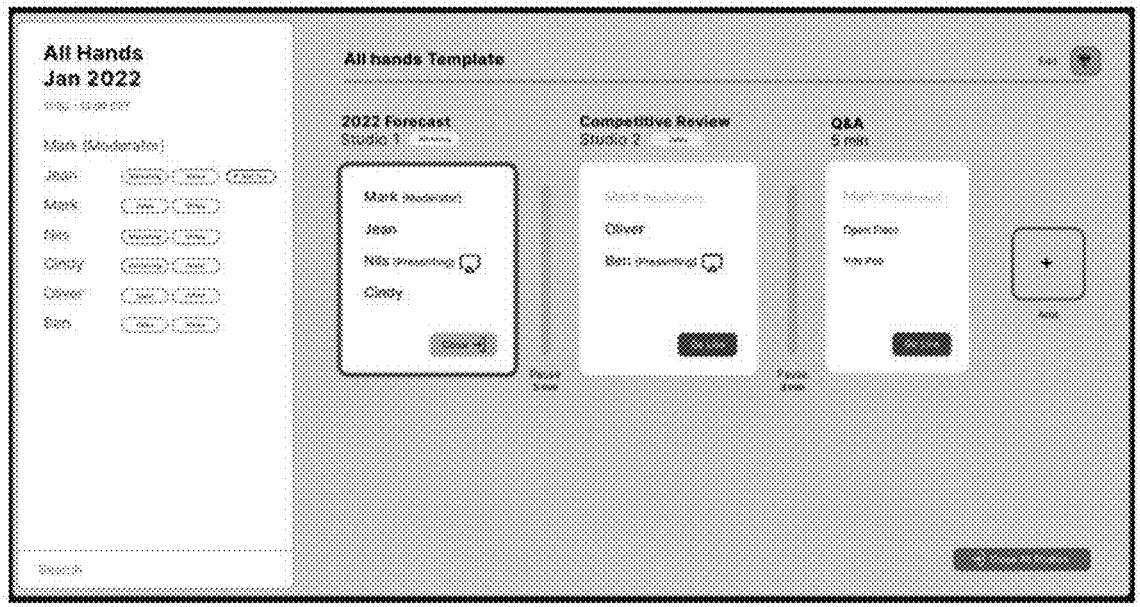
FIG. 3 is a schematic illustration of an exemplary staging template.

FIG. 3 illustrates a staging template for an All hands meeting defining two virtual studios, Studio 1 and Studio 2, and a switching sequence between Studio 1 and Studio 2. In Studio 1 there are four tagged videoconferencing terminals, Mark, Jean Nils and Cindy, each tagged with the name of the respective videoconferencing terminals. Mark is additionally assigned the tag moderator. In Studio 2, there are also three tagged video conferencing terminals, Mark, Oliver and Ben, each tagged with the name of the respective videoconferencing terminals. In addition, there may be other videoconferencing terminals that may have tags and policies attached to them that are not shown in this overview. One example may be employees that will listen, but not contribute, in the All hands meeting.

In this exemplary user interface, there is a "Go Live" button that initiates the first multi-point videoconferencing session initiated according to the first virtual studio, in this example Studio 1, such that each of the video conferencing terminals in the first multi-point videoconferencing session is connected to the MCN according to the first virtual studio policy of at least one tag of the video conferencing terminal.

In the illustrated example, Studio 1, may have the following tags and polices:

tag=employee-> policy: access: allowed; audio: mute microphone, transmit audio from MCN; video: transmit video from MCN, composed picture layout (inactive participant).

Any videoconferencing terminals connected to the MCN with this tag is allowed to listen to audio and view video from the three videoconferencing terminals that have an active role in the studio.

tag=Jean; Cindy-> policy: access: allowed; audio: transmit audio to MCN, transmit audio from MCN; video: transmit video to MCN, transmit video from MCN, composed picture layout (active participant)

The Jean and Cindy videoconferencing terminals can communicate with the other three videoconferencing terminals that have an active role in the studio, and transmit audio and video to any inactive videoconferencing terminals.

tag=Nils-> policy: access: allowed; audio: transmit audio to MCN, transmit audio from MCN; video: transmit video to MCN, transmit video from MCN, composed picture layout (presenter); presentation: transmit to MCN.

The Nils videoconferencing terminal can communicate with the other three videoconferencing terminals that have an active role in the studio, transmit audio and video to any inactive videoconferencing terminals, and transmit a presentation to any videoconferencing terminal connected to the MCN:

tag=moderator-> policy: access: allowed, studioswitching; audio: transmit audio to MCN, transmit audio from MCN; video: transmit video to MCN, transmit video from MCN, composed picture layout (moderator);

The Moderator videoconferencing terminal can communicate with the other three videoconferencing terminals that have an active role in the studio, transmit audio and video to any inactive videoconferencing terminals, and switch between studios.

A tag may be implemented as a macro function, such that a tag may call or be translated into another tag having a corresponding a policy. This would ease implementation when there are several tags in the same virtual studio with identical tag policies. For example, the policy for Jean may be implemented as an active participant policy with a corresponding active participant tag. The policy for employee may be implemented as an inactive participant policy with a corresponding inactive participant tag. In one example, while Studio1 is active, the two video conferencing terminal tags Oliver and Ben may call the tag "inactive participant" and two video conferencing terminals are connected to the MCN according to the "inactive participant" policy.

Upon switching to the second virtual studio, Studio 2, the first multi-point videoconferencing session is reconfigured according to policies of the second virtual studio, such that each of the videoconferencing terminals in the first multi-point videoconferencing session is connected to the MCN according to the second virtual studio policy for at least one tag of the video conferencing terminal.

In the illustrated example, Studio 2, may have the following tags and polices:

tag=employee; Jean; Cindy; Mark-> policy: access: allowed; audio: mute microphone, transmit audio from the first multi-point videoconferencing session; video: transmit video from the first multi-point videoconferencing session, composed picture layout (inactive participant).

Any videoconferencing terminals connected to the MCN with this tag is allowed to listen to audio and view video from the three videoconferencing terminals that have an active role in the studio.

tag=Oliver-> policy: access: allowed; audio: transmit audio to the first multi-point videoconferencing session, transmit audio from the first multi-point videoconferencing session; video: transmit video to MCN, transmit video from the first multi-point videoconferencing session, composed picture layout (active participant).

The Oliver videoconferencing terminal can communicate with the other two videoconferencing terminals that have an active role in the studio, and transmit audio and video to any inactive videoconferencing terminals.

tag=Ben policy: access: allowed; audio: transmit audio to the first multi-point videoconferencing session, transmit audio from the first multi-point videoconferencing session; video: transmit video to the first multi-point videoconferencing session, transmit video from the first multi-point videoconferencing session, composed picture layout (presenter); presentation: transmit to the first multi-point videoconferencing session.

The Ben videoconferencing terminal can communicate with the other two videoconferencing terminals that have an active role in the studio, transmit audio and video to any inactive videoconferencing terminals, and transmit a presentation to any videoconferencing terminal connected to the first multi-point videoconferencing session:

tag=moderator-> policy: access: allowed, studioswitching; audio: transmit audio to the first multi-point videoconferencing session, transmit audio from the first multi-point videoconferencing session; video: transmit video to the first multi-point videoconferencing session, transmit video from MCN, composed picture layout (moderator);

The Moderator videoconferencing terminal can communicate with the two videoconferencing terminals that have an active role in the studio, transmit audio and video to any inactive videoconferencing terminals, and switch between studios.

In the example discussed above with reference there is one multi-point videoconferencing session that is reconfigured according to the second virtual studio policy for the tags of the video conferencing terminals. In an alternative embodiment, Studio 1 and Studio 2, may be configured as two interconnected multi-point conferencing sessions on the MCN. Prior to Studio2 being the active virtual studio in the All hand meeting, Studio2 may be have an inactive studio policy for each of the tags. The inactive studio policy of Studio 2 may allow the Oliver and Ben videoconferencing terminals to communicate with the other videoconferencing terminal in Studio2 on a second multi-point videoconferencing session on the MCN, while simultaneously receive audio and video from Studio1 on the first multi-point videoconferencing session on the MCN. Ben can also present a present a presentation within Studio2 to prepare and/or discuss the presentation prior to being called into the All hands meeting.

In one embodiment, the step 203 of switching to the second virtual studio further comprises initiating a second multi-point videoconferencing session, such that each of the videoconferencing terminals in the second multi-point videoconferencing session is connected to the MCN according to the second virtual studio policy for at least one tag of the video conferencing terminal. The second multi-point conferencing session may be hosted on the same MCN as the first second multi-point videoconferencing session or on a second MCN in communication with the first MCN. Initiating the second multi-point videoconferencing session based on the second studio policy for at least one tag allows transferring a subset of the videoconferencing terminals to the second multi-point videoconferencing session according to the at least one tag.

Figure 4:
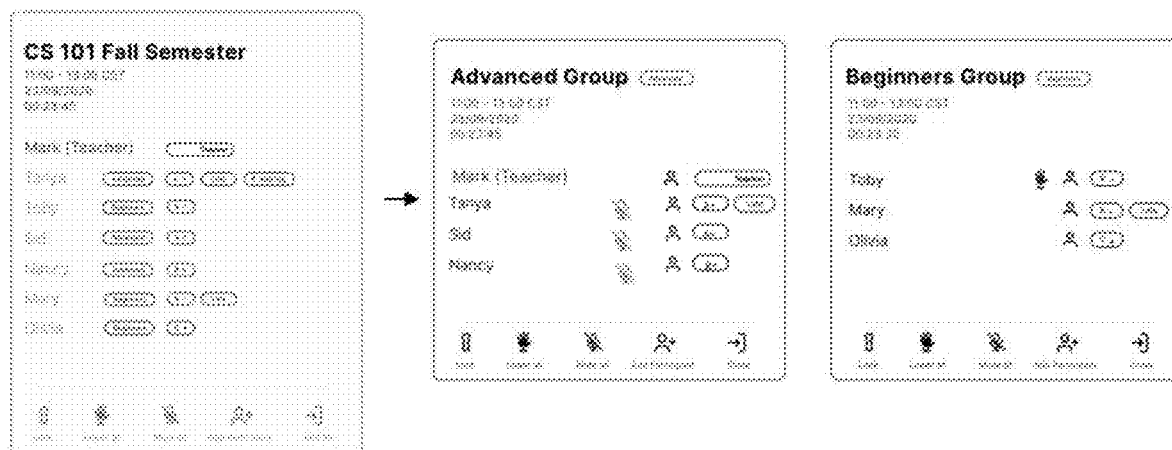
FIG. 4 is a schematic illustration of another exemplary staging template.

FIG. 4 illustrates an exemplary implementation of the invention used for breakout session in a classroom setting. The first virtual studio is a classroom 401. Each of the video conferencing terminals Mark, Tanya, Toby, Sid, Nancy, Mary and Olivia is connected to the first multi-point videoconferencing session in the MCN according to the first virtual studio policy of at least one tag of the video conferencing terminal. The first virtual studio policy of classroom 401 is that the tags "Beginner", "Advanced" and "Teacher" may hear, see, and speak to any of the video conferencing terminals in the first multi-point videoconferencing session. The tag "Teacher" is additionally allowed to switch between virtual studio settings. In this example, when switching to the second virtual studio, a second multi-point videoconferencing session 402B is initiated, and the video conferencing terminals tagged "Beginner" is connected to the second multi-point videoconferencing session according to the second virtual studio policy "Breakout". The first multi-point videoconferencing session is reconfigured according to the second virtual studio policy "Breakout" as the first multi-point videoconferencing session 402A for tags "Advanced". The second virtual studio policy "Breakout" is that the video conferencing terminals tagged "Beginner" may hear, see and speak to one another, and that the video conferencing terminals tagged "Advanced" may hear, see and speak to one another. The videoconferencing terminal tagged "Teacher" may move between the two multi-point videoconferencing sessions.

The defined sequence may further comprise switching from the second virtual studio to the first virtual studio, and the method further comprises terminating the second multi-point videoconferencing session when switching from the second virtual studio to the first virtual studio In an alternative embodiment, the step 203 of switching to the second virtual studio further comprises initiating a second multi-point videoconferencing session, such that each of the videoconferencing terminals in the second multi-point videoconferencing session is connected to the MCN according to a third virtual studio policy for at least one tag of the video conferencing terminal. The second multi-point conferencing session may be hosted on the same MCN as the first second multi-point videoconferencing session or on a second MCN in communication with the first MCN. Initiating the second multi-point videoconferencing session based on the third virtual studio policy for at least one tag allows transferring a subset of the videoconferencing terminals to the second multi-point videoconferencing session according to the at least one tag.

Figure 5:
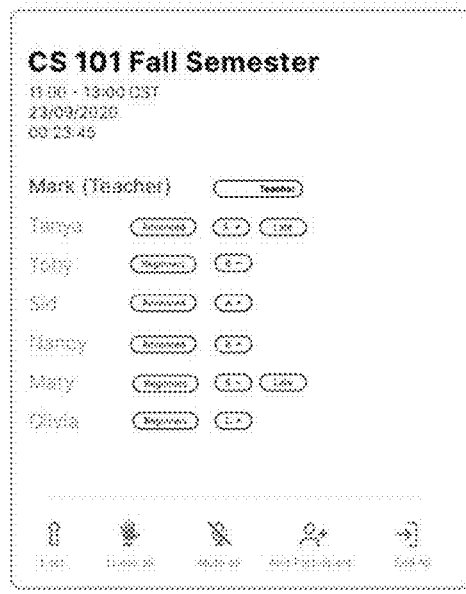
FIG. 5 is a schematic illustration of another exemplary staging template.
Figure 5:
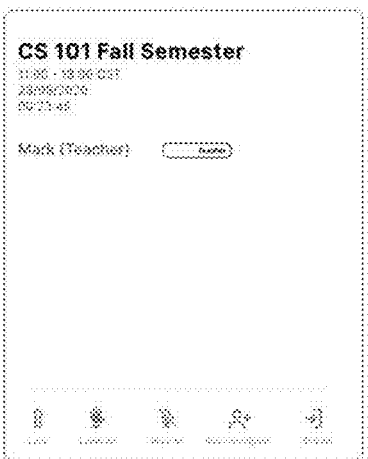
Figure 5:
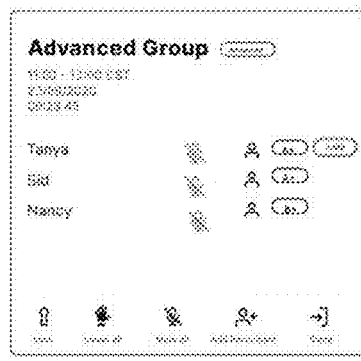
Figure 5:
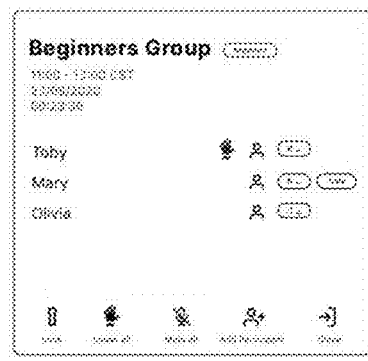

FIG. 5 illustrates an exemplary implementation of the invention used for breakout session in a classroom setting. The first virtual studio is a classroom 501. Each of the video conferencing terminals Mark, Tanya, Toby, Sid, Nancy, Mary and Olivia is connected to the first multi-point videoconferencing session in the MCN according to the first virtual studio policy of at least one tag of the video conferencing terminal. The first virtual studio policy of classroom 401 is that the tags "Beginner", "Advanced" and "Teacher" may hear, see, and speak to any of the video conferencing terminals in the first multi-point videoconferencing session. The tag "Teacher" is additionally allowed to switch between virtual studio settings. In this example, when switching to the second virtual studio, two additional multi-point videoconferencing sessions 502A, 502B is initiated, such that each of the videoconferencing terminals in the second multi-point videoconferencing sessions is connected to the MCN according to a third virtual studio policy "Breakout". The virtual studio policy for the two videoconferencing session 502A, 502A are identical except from the policy of the tags "Beginner" and "Advanced" such that the videoconferencing terminals tagged "Beginner" is connected to multipoint videoconferencing session 502B, and the videoconferencing terminals tagged "Advanced" is connected to the multipoint videoconferencing session 502A. The third virtual studio policy "Breakout" is that the video conferencing terminals tagged "Beginner" may hear, see and speak to one another, and that the video conferencing terminals tagged "Advanced" may hear, see and speak to one another. The first multi-point videoconferencing session 501 is reconfigured according to a second virtual studio policy "Invigilator" for the tag "Teacher". The second virtual policy "Invigilator" connects the first multi-point videoconferencing session 501 to the two other multi-point videoconferencing sessions 502A and 502B such that the videoconferencing terminal tagged "Teacher" hear and see all videoconferencing terminals connected to the multi-point videoconferencing sessions 502A and 502B.

The defined sequence may further comprise switching from the third virtual studio to the first virtual studio, and the method further comprises terminating the second multi-point videoconferencing session when switching from the third virtual studio to the first virtual studio.

Figure 6:
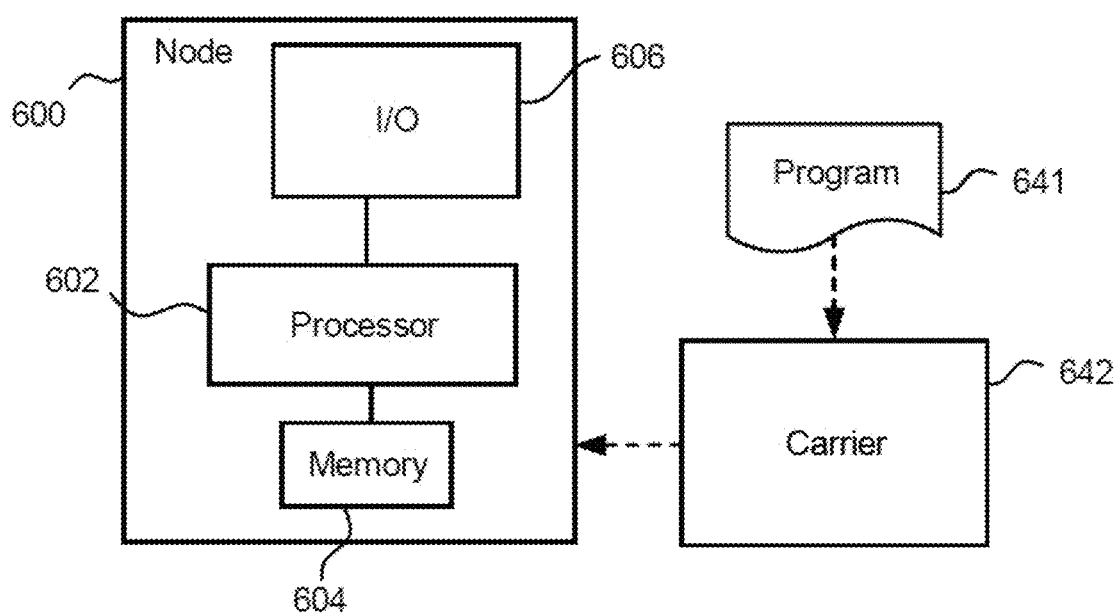
FIG. 6 is a schematic illustration of a Multipoint Conferencing Node.

Turning now to FIG. 6, a schematically illustrated multipoint conferencing node (MCN) 600. The MCN 600 comprises an input/output circuitry 606, at least one processor 602 and a memory 604. The memory 604 contains instructions executable by the processor 602, cause the image processing device 600 to:

- defining at least a first virtual studio and a second virtual studio, each of the at least first and second virtual studios comprising a policy for each of a set of the plurality of tags,
- initiating a first multi-point videoconferencing session according to the first virtual studio, such that each of the video conferencing terminals in the first multi-point videoconferencing session is connected to the MCN according to the first virtual studio policy of at least one tag of the video conferencing terminal; and
- reconfiguring, upon switching to the second virtual studio, the first multi-point videoconferencing session according to the second virtual studio, such that each of the videoconferencing terminals in the first multi-point videoconferencing session is connected to the MCN according to the second virtual studio policy for at least one tag of the video conferencing terminal.

The instructions that are executable by the processor 602 may be software in the form of a computer program 641. The computer program 641 may be contained in or by a carrier 642, which may provide the computer program 641 to the memory 604 and processor 602. The carrier 642 may be in any suitable form including an electronic signal, an optical signal, a radio signal or a computer readable storage medium.

As used herein, the term "computer readable medium" may be a universal serial bus (USB) memory, a digital versatile disc (DVD), a Blu-ray disc, a software module that is received as a stream of data, a Flash memory, a hard drive, a memory card, such as a MemoryStick, a multimedia card (MMC), secure digital (SD) card, etc. One or more of the aforementioned examples of computer readable medium may be provided as one or more computer program products.

In the preceding description, various aspects of the method and imaging processing device according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and image processing device, which are apparent to persons skilled in the art to which the disclosed subject matter pertains, are deemed to lie within the scope of the present invention.

What is claimed is:

1. A method of a multi-point videoconferencing system comprising a plurality of video conferencing terminals in communication with a multipoint conferencing node (MCN), wherein each of the videoconferencing terminals is assigned at least one of a plurality of tags, the method including:
   - defining at least a first virtual studio and a second virtual studio, each of the at least first and second virtual studios comprising a policy for each of a set of the plurality of tags;
   - initiating a first multi-point videoconferencing session according to the first virtual studio, such that each of the video conferencing terminals in the first multi-point videoconferencing session is connected to the MCN according to the first virtual studio policy of at least one tag of the video conferencing terminal;
   - reconfiguring, upon switching to the second virtual studio, the first multi-point videoconferencing session according to the second virtual studio, such that each of the videoconferencing terminals in the first multi-point videoconferencing session is connected to the MCN according to the second virtual studio policy for at least one tag of the video conferencing terminal;
   - defining a switching sequence of the at least first and second virtual studios, and switching between the at least first and second virtual studios according to the defined switching sequence, the defined switching sequence further including switching from the second virtual studio or a third virtual studio to the first virtual studio; and
   - terminating the second multi-point videoconferencing session when switching from the second virtual studio or the third virtual studio to the first virtual studio.

2. The method of claim 1, wherein the step of switching to the second virtual studio further comprises initiating a second multi-point videoconferencing session, such that each of the videoconferencing terminals in the second multi-point videoconferencing session is connected to the MCN according to the second virtual studio policy for at least one tag of the video conferencing terminal.

3. The method of claim 1, wherein the step of switching to the second virtual studio further comprises initiating a second multi-point videoconferencing session, such that each of the videoconferencing terminals in the second multi-point videoconferencing session is connected to the MCN according to the second virtual studio policy for at least one tag of the video conferencing terminal.

4. The method of claim 1, wherein the step of switching to the second virtual studio further comprises initiating a second multi-point videoconferencing session, such that each of the videoconferencing terminals in the second multi-point videoconferencing session is connected to the MCN according to a third virtual studio policy for at least one tag of the video conferencing terminal.

5. The method of claim 1, wherein the step of switching to the second virtual studio further comprises initiating a second multi-point videoconferencing session, such that each of the videoconferencing terminals in the second multi-point videoconferencing session is connected to the MCN according to a third virtual studio policy for at least one tag of the video conferencing terminal.

6. The method of claim 4, wherein the defined switching sequence further comprises switching from the second virtual studio or the third virtual studio to the first virtual studio, and the method further comprises terminating the second multi-point videoconferencing session when switching from the second virtual studio or the third virtual studio to the first virtual studio.

7. The method of claim 1, wherein the method further comprises assigning at least one additional tag to at least one of the videoconferencing terminals in the first virtual studio, such that upon switching from the first virtual studio to the second virtual studio, the at least one of the videoconferencing terminals is connected to the MCN according to the second virtual studio policy or the third virtual studio policy for the at least one additional tag.

8. The method of claim 7, wherein the policy comprises at least one audio setting for the videoconferencing terminals.

9. The method of claim 8, wherein the policy comprises at least one video setting for the videoconferencing terminals.

10. The method of claim 9, wherein the policy comprises a presentation setting.

11. The method of claim 10, wherein the policy comprises at least one access setting.

12. The method of claim 11, wherein the at least one tag of the video conferencing terminal is determined by a directory service listing for the video conferencing terminal.

13. The method of claim 12, wherein the at least one tag of the video conferencing terminal is determined dynamically by the MCN.

14. A multi-point videoconferencing system comprising a plurality of video conferencing terminals in communication with a multipoint conferencing node (MCN), wherein each of the videoconferencing terminals is assigned at least one of a plurality of tags, the MCN being adapted to perform the method including:

defining at least a first virtual studio and a second virtual studio, each of the at least first and second virtual studios comprising a policy for each of a set of the plurality of tags;

initiating a first multi-point videoconferencing session according to the first virtual studio, such that each of the video conferencing terminals in the first multi-point videoconferencing session is connected to the MCN according to the first virtual studio policy of at least one tag of the video conferencing terminal;

reconfiguring, upon switching to the second virtual studio, the first multi-point videoconferencing session according to the second virtual studio, such that each of the videoconferencing terminals in the first multi-point videoconferencing session is connected to the MCN according to the second virtual studio policy for at least one tag of the video conferencing terminal;

defining a switching sequence of the at least first and second virtual studios, and switching between the at least first and second virtual studios according to the defined switching sequence, the defined switching sequence further including switching from the second virtual studio or the third virtual studio to the first virtual studio; and terminating the second multi-point videoconferencing session when switching from the second virtual studio or a third virtual studio to the first virtual studio.

15. A computer program product, comprising a non-transitory computer readable storage medium comprising instructions that, when executed on a processor in a multi-point conferencing node (MCN), enables the MCN to perform the steps of the method including:

defining at least a first virtual studio and a second virtual studio, each of the at least first and second virtual studios comprising a policy for each of a set of the plurality of tags;

initiating a first multi-point videoconferencing session according to the first virtual studio, such that each of the video conferencing terminals in the first multi-point videoconferencing session is connected to the MCN according to the first virtual studio policy of at least one tag of the video conferencing terminal;

reconfiguring, upon switching to the second virtual studio, the first multi-point videoconferencing session according to the second virtual studio, such that each of the videoconferencing terminals in the first multi-point videoconferencing session is connected to the MCN according to the second virtual studio policy for at least one tag of the video conferencing terminal;

defining a switching sequence of the at least first and second virtual studios, and switching between the at least first and second virtual studios according to a defined switching sequence, the defined switching sequence further including switching from the second virtual studio or the third virtual studio to the first virtual studio; and terminating the second multi-point videoconferencing session when switching from the second virtual studio or a third virtual studio to the first virtual studio.

* * * * *